UNITED STATES PATENT OFFICE.

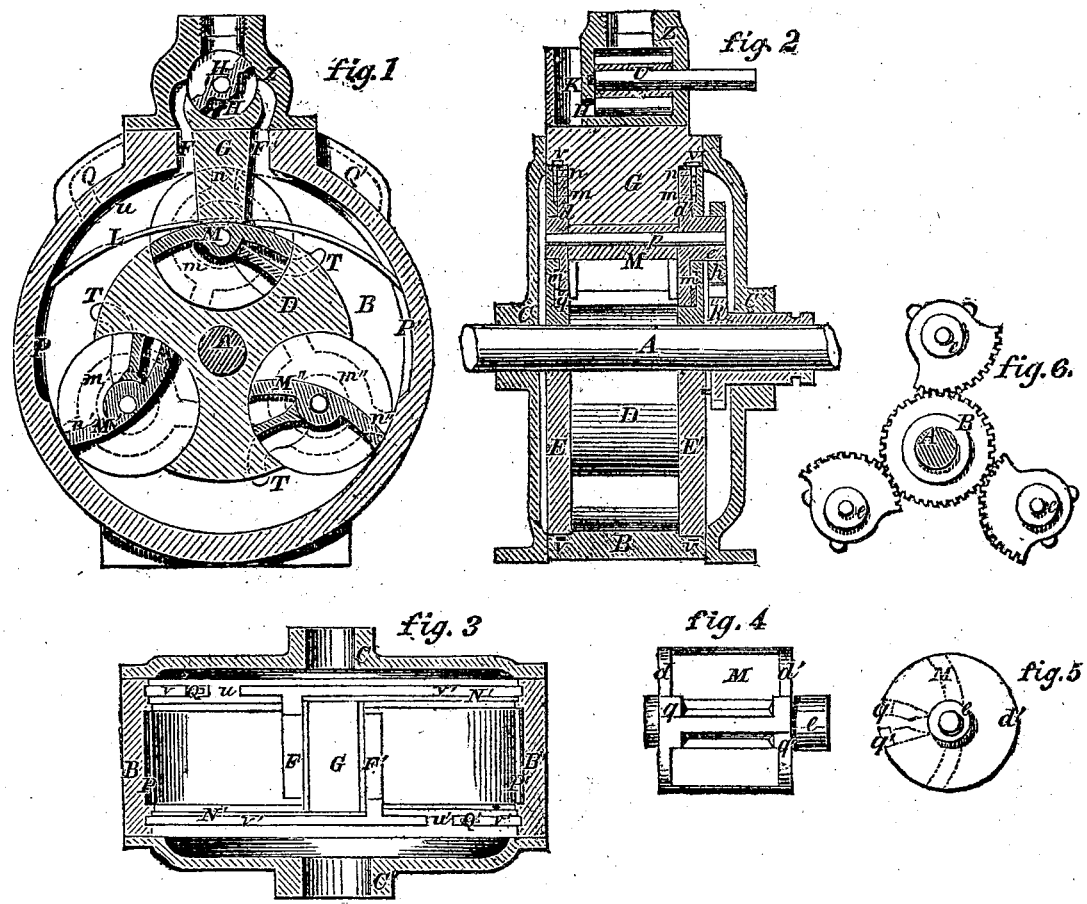

CHRISTIAN E. OFFHAUS, OF NEWARK, NEW JERSEY.

ROTARY STEAM-ENGINE.

Specification of Letters Patent No. 13,550, dated September 11, 1855.

*To all whom it may concern:*

Be it known that I, CHRISTIAN E. OFFHAUS, of Newark, in the county of Essex, in the State of New Jersey, have invented a new and Improved Rotary Engine; and I do hereby declare that the following is a full, clear, and exact description of the construction and operation of the same, reference being had to the annexed drawings, making a part of this specification, in which—

Figure I, is a vertical longitudinal section. Fig. II, is a view with the side plate C' removed. Fig. III, is a vertical transverse section. Fig. IV, is a horizontal section of the outer casing or cylinder, showing the steam passages in the upper part of the same. Fig. V, is a side elevation of the machine. Figs. VI and VII are side and top views of one of the piston valves and frame.

The same letters of reference indicate like parts.

A is the driving shaft passing through the side plates (C, C') of the cylinder (B).

D is a centerpiece or the revolving piston firmly keyed to the driving shaft (A) and provided with recesses in which the piston valves are fitted capable of moving said centerpiece forming with the piston valves, when closed, a regular cylinder, so as to pass under the projection (G) of the cylinder.

E, E', are circular side plates screwed fast to each side of the centerpiece (D) and fitted steamtight into turned-in recesses (N, N') of the cylinder (B). These plates (E, E',) have suitable circular recesses for the reception of the piston valve frames. $m, m', m''$ are grooves turned into those recesses, communicating with openings ($n, n', n''$) through the circumference of the plates (E, E'), with grooves ($v$ and $v'$) made in the recesses (N, N'), respectively, of the cylinder (B), and likewise with openings or holes ($q, q'$) through the piston valve frames, with the inner side of the piston valves.

M, M', M'', are the piston valves, turning on centerpieces ($p$,) fast to the valve frames.

The valve frames consist of two circular plates ($d, d'$) fitting into the recesses in the plates (E, E') as above mentioned, capable of turning in the same and ground in steam tight and connected together by a partition ($f$) made to fit tight into the recesses of the centerpiece (D) and against the hubs of the piston valves, forming thereby an abutment to confine the steam, so that the steam shall act on one or the other half of the piston valves as may be desired and required. The plates ($d, d'$) have small projections ($a, a$) on both sides of the partition ($f$) for the piston valves to abut against when opening or closing.

$q, q'$, are openings through the plates ($d, d'$) and situated on opposite sides of the partition ($f$) corresponding with openings leading to the grooves ($m, m', m''$,) in the plates (E E') forming thereby a communication, when the piston valves are closed, between the grooves ($m, m', m''$) and the inner sides of the piston valves as before described. The hubs ($e$) of the plates ($d'$) pass through the plate (E') and receive on the outside segments ($h$) to change the position of the piston valve frames by, when the motion of the engine requires to be reversed.

B, is the cylinder or casing, having suitable recesses (N N') turned in, to receive the plates (E, E'), and provided with a projection (G), forming an abutment for the steam to abut against, and dividing the entrance and escape steam passages. This projection is made steamtight between the plates (E, E') and the centerpiece (D).

F, F' are the steam passages to conduct the steam from and to the steam nozzle (Z) and the inside of the cylinder (B).

P, P', are recesses made in the center part of the cylinder, part of the way around, between the inner space of the plates (E, E') and communicating with the steam passages (F, F').

L is a spring or guide attached to the projection (G) and extending to the sides of the cylinder (B), to regulate the gradual opening of the piston valves, after the same have passed from under the projection (G).

$v, v'$, are grooves made in the recesses (N, N') and provided with abutments ($u, u'$) and ($w, w'$) by which said abutments each groove is divided so that one part of each groove may be used as steam and the other part as exhaust passage. Part of the groove ($v$) is connected with the steam passage (F) and the other part, through the passage (Q) with the exhaust pipe. Part of the groove ($v'$) is connected with the steam passage (F') and the other part, through the passage (Q') with the exhaust pipe (K).

Z, is the steam nozzle, provided with a valve (U) to conduct the steam to either of the passages F or F′ as required, and having an opening (H) under the valve (U) communicating with the escape steam pipe (K). Instead of this arrangement, a valve casing with a D valve may be placed over the passages F and F′ to regulate the entrance and escape of the steam from and to the cylinder.

T are recesses made in the plate E, E′ forming a passage from the outside of the center-piece (D), under the same to the inside of the piston valves, when the same are closed, for the steam to enter the inside, when required, or for the therein contained steam to escape from.

R is a tooth wheel situated on the shafts (A), the hub of which passes through the sideplate (C′) and receives on the outside the wheel (W) which is firmly attached to the same. This wheel (R) meshes into the segments (h), fast to the piston valve frames, and is provided with a stop pin (x), fitting into a corresponding hole in the plate (E′) by which said stop pin the wheel (R) is prevented from turning.

S, is a handle attached to the outside of the sideplate (C′) and working in a groove, made in the hub of the wheel (R) by which the same can be moved sufficiently far outward to bring the stop pin (x) out of its hole, when the said wheel (R) requires to be turned. Through this wheel (R) and the segments (h) the piston valve frames are moved and consequently the position of the piston valves changed when the motion of the engine requires to be reversed.

Y, Y′ are stops fast to the plate (E′) to regulate the exact position of the piston valves when the same are changed.

The operation of the engine is as follows: Steam being admitted into the nozzle (Z) the same will pass through the passage (F) into the cylinder (B) and act upon the open piston valves, turning thereby the center piece (D) and consequently the shaft (A). Said steam escaping again after the piston valves have moved sufficiently around and have come opposite the channel (P′), through said channel (P′) the passage (F′) and the hole (H) to the escape steam pipe (K). Supposing that in the position represented in the drawing, the space between the piston valves (M′) and (M″) is filled with steam, the opening (n″) through the circumference of the plate (E) will as soon as the same has passed the abutment (w) in the groove (v) open a passage for the live steam, coming from the passage (F) into said groove (v), though said opening (n″) the groove (m) and through the hole (q) to the inside of the inner half of the piston valve (M″), closing thereby by its action upon said part of the valve, said piston valve (M″) as soon as the steam escapes from the other half, after coming opposite the channel (P′), and keep said valve by its action shut, until the same has passed under the projection (G), forming in that position an uninterrupted surface and a regular circle with the center-piece (D) as above described.

When the centerpiece (D) has moved sufficiently far, to bring the piston valve (M) and the recess (T) past the projection (G) the live steam will enter through the passage or recess (T) under the center-piece D behind the piston valve (M). The opening (n) through the circumference of the plate (E) will then have passed the abutment (u) and come in communication with that part of the groove (v) which is connected through the passage (Q) with the escape steam pipe (K), opening thereby a free passage through said opening (n) the groove (m) and the hole (q) with the escape steam pipe (K), to allow the steam which was behind this part of the piston valve (M), and has by its action kept said valve shut, to escape into the escape steam pipe producing thereby a vacuum behind that part of the piston valve, when the steam, which as above mentioned has been led behind the other part of said piston valve through the recess (T) will gradually open the same, said gradual opening of the piston valve being regulated by the spring or bar (L).

When the motion of the engine and consequently of the piston is desired to be reversed, the valve (U) in the nozzle (Z) is first changed, to change the entrance of the steam into the cylinder. The wheel (R) is then a little pulled out by the handle (S) to bring the stop pin (x) out of its hole and then turned around by the handwheel (W) which said wheel (R) by its action upon the segments (h) turns then the piston valve frames so as to change the position of the piston valves, that the same will open the opposite way and by the action of the steam against said piston valves turn the center piece (D) the reverse way around. The openings (q′) through the plates (d′) of the piston valve frames will then correspond with openings leading to the groove (m or m′ or m″) communicating with the openings (n, n′, n″,) in the circumference of the plate (E′) and communicating then through the groove (v′) with the steam or exhaust passages, so as to allow through those passages alternately the steam and vacuum to act upon the inner half of the piston valves in the manner as above described, and opening or shutting thereby said valves when required.

When the engine is only required to be single acting that is to turn only continually one way as by stationary engines, the grooves and openings in one of the plates (E) or (E′) as well as the segments (h)

with its wheel (R) and the corresponding gearing will not be required.

What I claim as my invention and desire to secure by Letters Patent is—

1. The construction of the revolving piston in rotary engines with piston valves, said piston valves being made to open and shut by the action of the steam, without any extra friction against any part on the inside of the cylinder.

2. I claim the arrangement of the openings and passages in the side plates (E, E') in connection with the grooves (v, v') in the cylinder (B), forming a communication between the inner sides of the piston valves and the steam and exhaust passages alternately, in the manner and for the purpose as described.

3. I claim the construction of the piston valves and frames and the manner of changing the position of the same, when the motion of the engine requires to be reversed.

CHRISTIAN ERNST OFFHAUS.

Witnesses:
HENRY E. ROEDER,
ROCHUS HEINISCH.